United States Patent [19]
Wehner

[11] Patent Number: 4,805,227
[45] Date of Patent: Feb. 14, 1989

[54] PARALLEL PIPELINE IMAGE PROCESSOR WITH 2×2 WINDOW ARCHITECTURE

[75] Inventor: William W. Wehner, Mounds View, Minn.

[73] Assignee: Honeywell Inc., Minneapolis, Minn.

[21] Appl. No.: 85,057

[22] Filed: Aug. 13, 1987

[51] Int. Cl.[4] .............................................. G06K 9/36
[52] U.S. Cl. ......................................... 382/41; 382/49
[58] Field of Search ........................ 382/49, 41, 21, 27

[56] References Cited

U.S. PATENT DOCUMENTS

| | | |
|---|---|---|
| 4,167,728 | 9/1979 | Sternberg . |
| 4,484,349 | 11/1984 | McCubbrey . |
| 4,574,394 | 3/1986 | Wlodzimierz et al. . |
| 4,601,055 | 7/1986 | Kent . |
| 4,685,144 | 8/1987 | McCubbrey et al. .................. 382/49 |
| 4,689,823 | 8/1987 | Wojcik et al. ......................... 382/49 |

OTHER PUBLICATIONS

Basics of Cellular Logic with Some Applications in Medical Image Processings, Preceedings of the IEEE, vol. 67, No. 5, May, 1979.

Primary Examiner—Theodore M. Blum
Attorney, Agent, or Firm—Robert A. Pajak

[57] ABSTRACT

The present invention discloses an image processor which utilizes a neighborhood transformation module for performing a two by two window transformation. Further, the invention utilizes raster scan reversals in combination with the two by two window neighborhood transformation scheme to provide efficient transformations utilizing simple circuit components.

15 Claims, 7 Drawing Sheets

| CK1 | A | B | H | F | G | C | D | RESULT |
|---|---|---|---|---|---|---|---|---|
| 1 | 1 | | | | | | | |
| 2 | 2 | 1 | 1 | | | | | |
| 3 | 3 | 2 | | 1 | | 1 | | |
| 4 | 4 | 3 | | 1 | 1 | | | |
| 5 | 5 | 4 | | 1 | 1 | 1 | | |
| 6 | 6 | 5 | 5 | 1 | 1 | 2 | 1 | NT1 |
| 7 | 7 | 6 | | 5 | 1 | 3 | 2 | NT2 |
| 8 | 8 | 7 | | 5 | 1 | 4 | 3 | NT3 |
| 9 | 9 | 8 | | 5 | 1 | 5 | 4 | NT4 |
| 10 | 10 | 9 | 9 | 5 | 5 | 6 | 5 | NT5 |
| 11 | 11 | 10 | | 9 | 5 | 7 | 6 | NT6 |
| 12 | 12 | 11 | | 9 | 5 | 8 | 7 | NT7 |
| 13 | 13 | 12 | | 9 | 5 | 9 | 8 | NT8 |
| 14 | 14 | 13 | 13 | 9 | 9 | 10 | 9 | NT9 |
| 15 | 15 | 14 | | 13 | 9 | 11 | 10 | NT10 |
| 16 | 16 | 15 | | 13 | 9 | 12 | 11 | NT11 |
| 17 | 17 | 16 | | 13 | 9 | 13 | 12 | NT12 |

Fig. 6

| CK1 | A | B | H | F | G | C | D | RESULT |
|---|---|---|---|---|---|---|---|---|
| 1 | 16 | | | | | | | |
| 2 | 15 | 16 | 16 | | | | | |
| 3 | 14 | 15 | | 16 | | | | |
| 4 | 13 | 14 | | 16 | 16 | | | |
| 5 | 12 | 13 | | 16 | 16 | 16 | | |
| 6 | 11 | 12 | | 16 | 16 | 15 | 16 | T1 |
| 7 | 10 | 11 | | 12 | 16 | 14 | 15 | T2 |
| 8 | 9 | 10 | | 12 | 16 | 13 | 14 | T3 |
| 9 | 8 | 9 | | 12 | 16 | 12 | 13 | T4 |
| 10 | 7 | 8 | | 12 | 12 | 11 | 12 | T5 |
| 11 | 6 | 7 | | 8 | 12 | 10 | 11 | T6 |
| 12 | 5 | 6 | | 8 | 12 | 9 | 10 | T7 |
| 13 | 4 | 5 | | 8 | 12 | 8 | 9 | T8 |
| 14 | 3 | 4 | | 8 | 8 | 7 | 8 | T9 |
| 15 | 2 | 3 | | 4 | 8 | 6 | 7 | T10 |
| 16 | 1 | 2 | | 4 | 8 | 5 | 6 | T11 |
| 17 | — | 1 | | 4 | 8 | 4 | 5 | T12 |

PARALLEL PIPELINE IMAGE PROCESSOR WITH 2×2 WINDOW ARCHITECTURE

BACKGROUND OF THE INVENTION

This invention relates to image processors. In particular, a 2×2 window serial neighborhood transformation processor operates on separate segments of a partitioned image data matrix.

BACKGROUND

Neighborhood image processors are a class of devices that operate upon a first array or matrix of image sensor data values stored in cells or registers of an image data memory. The image data values stored in each of the cells generally originate from discrete pixels in the image generated by a 2-dimensional sensor plane responsive to light projected thereon. Neighborhood image processors operate on the image data values to generate subsequent transformation matrixes in which each cell thereof has a value depending upon its value in the preceding matrix of the image data memory and the values of its surrounding or neighboring cells in the preceding matrix. In turn, subsequent transformations can be generated by operating on the previous transformation matrix. Neighborhood transformation processes are crucial to efficient low-level, high-data rate processing in image processing, image understanding, machine vision applications, and the like. Computational requirements of neighborhood transformation processors can be in the billions of operations per second. This is so because of the high data rates involved in image processing (about 8 million pixels per second for 525 line T.V. video) and large number of operations which must be performed in executing algorithms (several hundred operations per pixel). Neighborhood transformation processors have proven to be effective in extracting many primitive characteristics from imagery which are valuable in understanding image content and in image data compression (for example, finding boundaries or edges of objects, i.e. Sobel and Roberts edges).

Generally, the invention of the present application has broader applications than image processors. The present invention is also intended to be applicable to any two dimensional array of data which needs to be transformed by the neighborhood transformation process.

An example of a neighborhood image processor is disclosed in U.S. Pat. No. 4,484,349, issued to David L. McCubbrey, and is herein incorporated by reference. McCubbrey discloses a serial neighborhood processor which employs a chain or a pipeline of individually programmable serial neighborhood transformation stages. Each stage is capable of generating the transformed value of one pixel within a single clock pulse interval. The output of each serial neighborhood transformation stage occurs at the same rate as its input. This allows the output of one stage to be provided to the input of a subsequent stage which may perform different neighborhood transformations. Each stage thus performs one specific transformation over the entire image.

Further, McCubbrey discloses the technique of partitioning the image matrix s that contiguous segments of the image can be processed simultaneously by two or more adjacent serial neighborhood transformation processors. In such a system, provisions must be provided to bi-directionally transfer data between adjacent serial neighborhood processors. This transfer becomes necessary when neighboring cells of the cell being transformed in one processor is contained in the image matrix segment of an adjacent image matrix segment.

BRIEF DESCRIPTION OF THE INVENTION

The object of the present invention is to provide a simple architecture for a neighborhood transformation module which can be incorporated into a parallel pipeline image processor.

Another object of the invention is to provide a neighborhood transformation module architecture which performs neighborhood transformations on a 2×2 window.

The present invention contemplates a neighborhood transformation module (NTM) for performing a 2×2 window transformation. In the present invention, the NTM is comprised of two storage registers separated by a segment delay. The input to the first storage register, the outputs of the first and second storage registers and the output of the segment delay are presented to a multipath switch for subsequent neighborhood transformation processing. Further, the 2×2 neighborhood transformation module architecture also includes two shift registers and an additional storage register for transferring data between parallel neighborhood transformation modules.

In the preferred embodiment, one of the shift registers of the NTM module latches onto an edge data value for availability by adjacent (parallel) NTM modules. The binary data of the shift register is serially passed to an adjacent NTM's input shift register. The input shift register is appropriately connected to the multipath switch so that the neighborhood transformation can be performed using adjacent NTM's edge data.

Further, the present invention contemplates the use of raster scan reversals in combination with the 2×2 window neighborhood transformation scheme. The neighborhood transformation module architecture of the present invention permits the scan reversal by the same NTM architecture without any additional change in hardware or control synchronization.

DETAILED DESCRIPTION OF THE INVENTION

Figure 1:
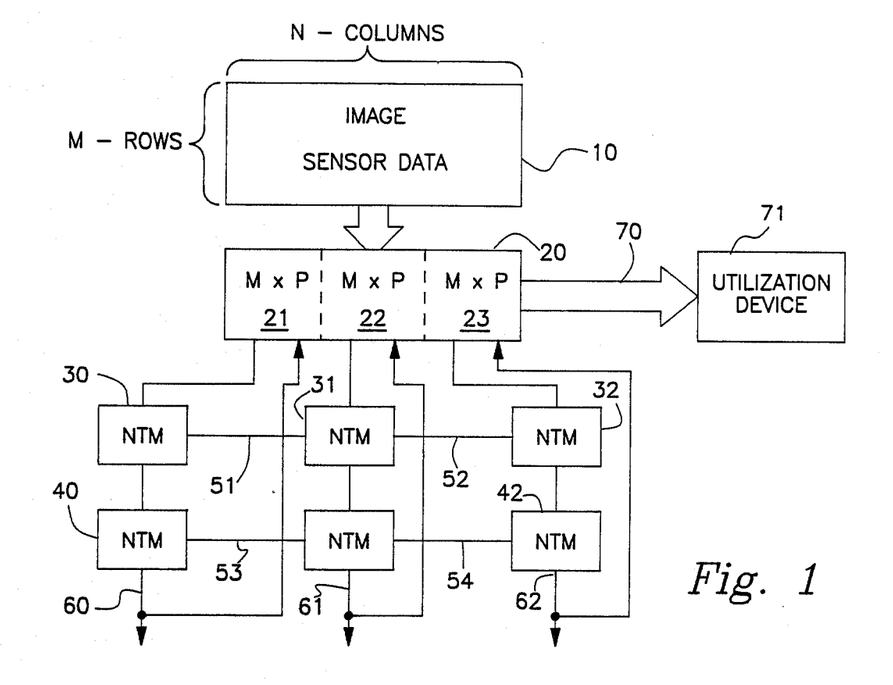
FIG. 1 is a block diagram of a parallel partition serial neighborhood image processing system.

Illustrated in FIG. 1 is a parallel pipeline image processor similar to that shown in U.S. Pat. No. 4,484,349 described earlier. Image sensor data from a two dimensional image sensor plane 10 having N-columns and M-rows is transferred to an image data memory means 20. For exposition purposes, the memory 10 can be visualized as a two dimensional array of storage registers also having M-rows and N-columns. Each of the registers in memory 20 can be addressed by its row and column address. As should be understood by those skilled in the art, many techniques of memory mapping may be employed to obtain the intended result of keeping track of the location of the image. Further illustrated in FIG. 1, memory 20 is geographically divided into K-partitions (K =3 in the drawing) numerically identified as 21, 22, and 23. Each of the partitions is comprised of M-rows and P-columns. In the present invention, the partitions are preferably identical in array size.

Data from a first partition 21 is serially presented to neighborhood transformation module (NTM) 30. The output of NTM 30 is serially presented to NTM 40. The output 60 of NTM 40 is shown coupled back into memory means 20.

In a similar manner, a second partition 22 of memory means 20 is serially presented to NTM 31 and NTM 41 in succession The output 61 of NTM 41 is coupled back to memory means 20. Likewise, the 3rd partition identified by the numeral 2 is presented to NTM 32 and NTM 42 in succession, and the output 62 of module 42 is also coupled back to memory means 20.

In practice, NTM modules 30, 31 and 32 are substantially identical and perform substantially the same neighborhood transformation process (i.e., they utilize substantially the same neighborhood transformation algorithm). Similarly, NTM modules 40, 41 and 42 are substantially identical, and are intended to perform an identical neighborhood transformation. The transformation algorithm performed by the first transformation stage including NTM modules 30, 31, and 32, and the transformation algorithm performed by the second transformation stage including NTM modules 40, 41, and 42 are usually different, although may be the same algorithm. Each of the algorithms performed by each of the stages depends on the type of image processing desired. In the present invention, each of the neighborhood transformation modules are identical except for control information (not shown) which can change the algorithm performed by each of the NTM modules.

Again referring to FIG. 1, interconnection means 51 provides a path for transferring edge data between modules 30 and 31. Similarly, interconnection means 52 provides means for transferring edge data between modules 31 and 32. Interconnection means 53 transfers edge data between modules 40 and 41, and interconnection means 54 provides a path for transferring edge data between modules 41 and 42.

It should be recognized by those skilled in the art that there may be a number of partitions between the second partition identified by numeral 22 and the 3rd partition identified by numeral 23. The number of partitions selected is a matter of design choice.

Also shown in FIG. 1, memory 20 includes an output means 70 which is generally intended to be connected to a utilization device 71, such as display electronics for video output. However, it should also be recognized that the output of modules 40, 41 and 42 could also be used as a direct connection to a utilization device.

Figure 2:
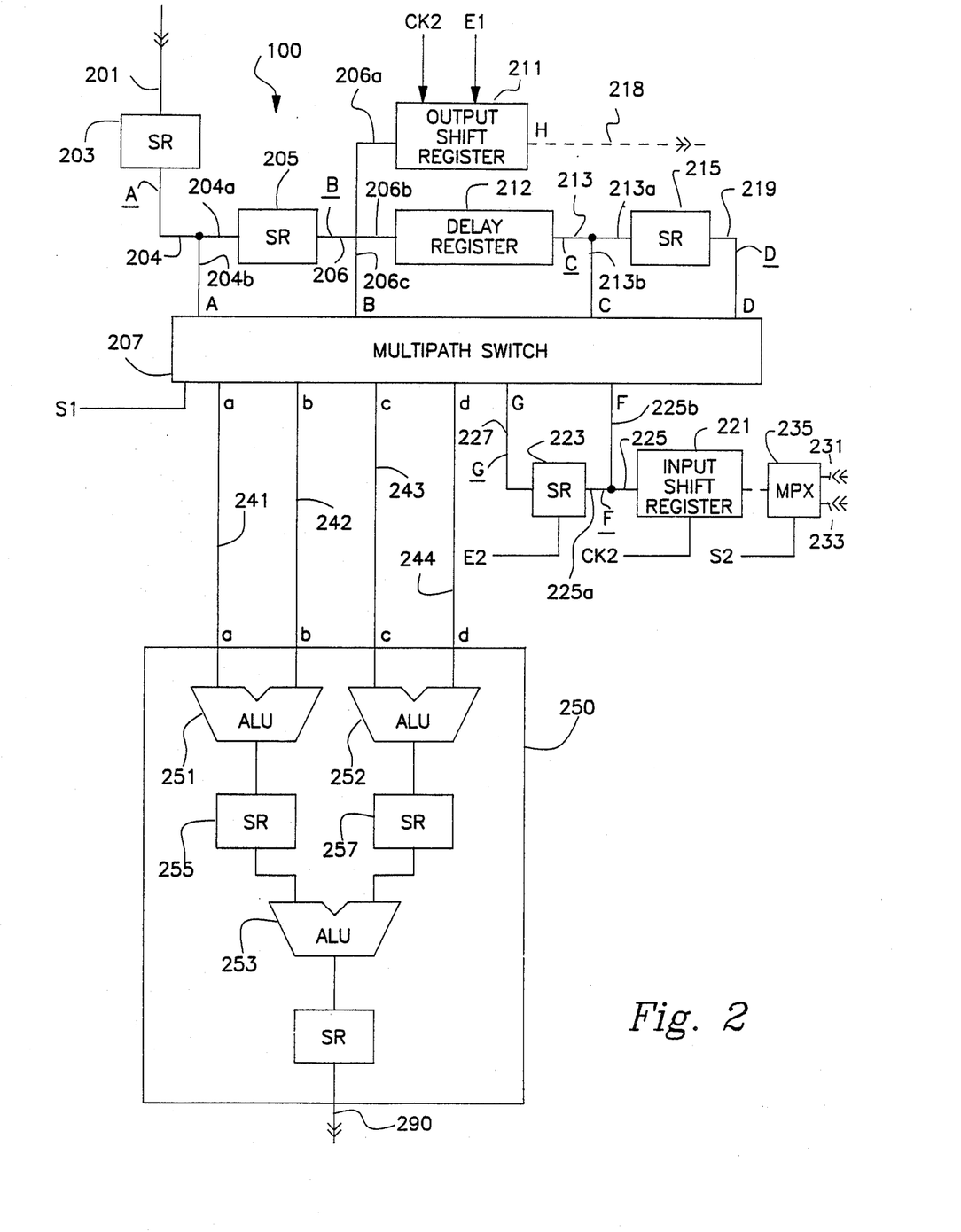
FIG. 2 is a block diagram of a neighborhood transformation module in accordance with the present invention.

The description so far presented is, in part, essentially that known in the art, and particularly described by U.S. Pat. No. 4,484,349. Illustrated in FIG. 2 is a schematic block diagram of one of the neighborhood transformation modules shown in FIG. 1 in accordance with the present invention in which a 2×2 window transformation is an integral part of the transformation process. In FIG. 2, the single signal lines illustrated may actually be a plurality of signal lines, i.e. a parallel signal buss.

The architecture of the neighborhood transformation module 100 illustrated in FIG. 2 is operative to perform a 2×2 window neighborhood transformation as aforesaid, and may be used for any of the NTM modules of FIG. 1. Each NTM module includes an input means 201 presented to a storage register (SR) 203. Storage register 203 includes an output 204, also identified by the signal letter "A", which is presented to an input of storage register 205 and multipath switch 207 on connection means 204a and 204b, respectively. Storage register 205 includes an output 206, also identified by the signal letter "B", presented to output shift register 211, delay register 212, and multipath switch 207 on connection means 206a, 206b, and 206c, respectively. Output shift register 211 includes an output 218 also identified by signal letter "H". Delay register 212 includes an output 213, also identified by the signal letter "C", presented to storage register 215 and multipath switch 207 on connection means 213a and 213b, respectively. Storage register 215 includes an output 219, also identified by the signal letter "D", presented to multipath switch 207.

Module 100 further includes input shift register 221 having its output 225, also identified by signal letter F, presented to storage register 223 and multipath switch 207 on connection means 225a and 225b, respectively. The output 227, also identified by signal letter G, of storage register 223 is connected to multipath switch 207 on connection means 227. The input shift register 221 receives its input via input means 231 or 233 through multiplexer 235 under control of switch control S2.

Multipath switch 207 provides four outputs 241, 242, 243, and 244, having signals identified by signal letters "a", "b", "c" and "d", respectively. These outputs are presented as inputs to neighborhood transformation processor 250 which includes arithmetic logic units (ALU) 251, 252 and 253. ALU 251 operates on signals "a" and "b", and ALU 252 operates on signals "c" and "d". The output of ALU 251 is presented to ALU 253 through a storage register 255. Similarly the output of ALU 252 is presented to ALU 253 through storage register 257. It should be noted that the input, output, and internal connections of processor 250 as just described is only exemplary in nature for performing the intended function.

Each of the storage registers, the delay register 212, and arithmetic logic units are intended to be synchronously operated by a central clock signal CK1 (not shown). The clock signal CK1 has been left out of the diagram in order to simplify the drawing for ease in understanding the present invention. (synchronous and asynchronous control being well understood in the control arts). Both the output shift register 211 and the input shift register 221 are shown to be serially shifted by a common clock signal CK2. However, independent clock signals may be utilized. (It should be noted that the input to shift register 221 and the output of shift register 211 are serial in form, and therefore simplifies the architecture since no parallel buss line is required). Further, output shift register 211 also includes an enabling signal E1 to cause the storage of the output of register 205, under control of E1. Storage register 223 also includes enabling signal E2 to cause the storage of the output of input shift register 221 under control of E2. Lastly, multipath switch 207 is illustrated having a control switch signal S1 which will function in a manner as will be described below.

Figure 3:
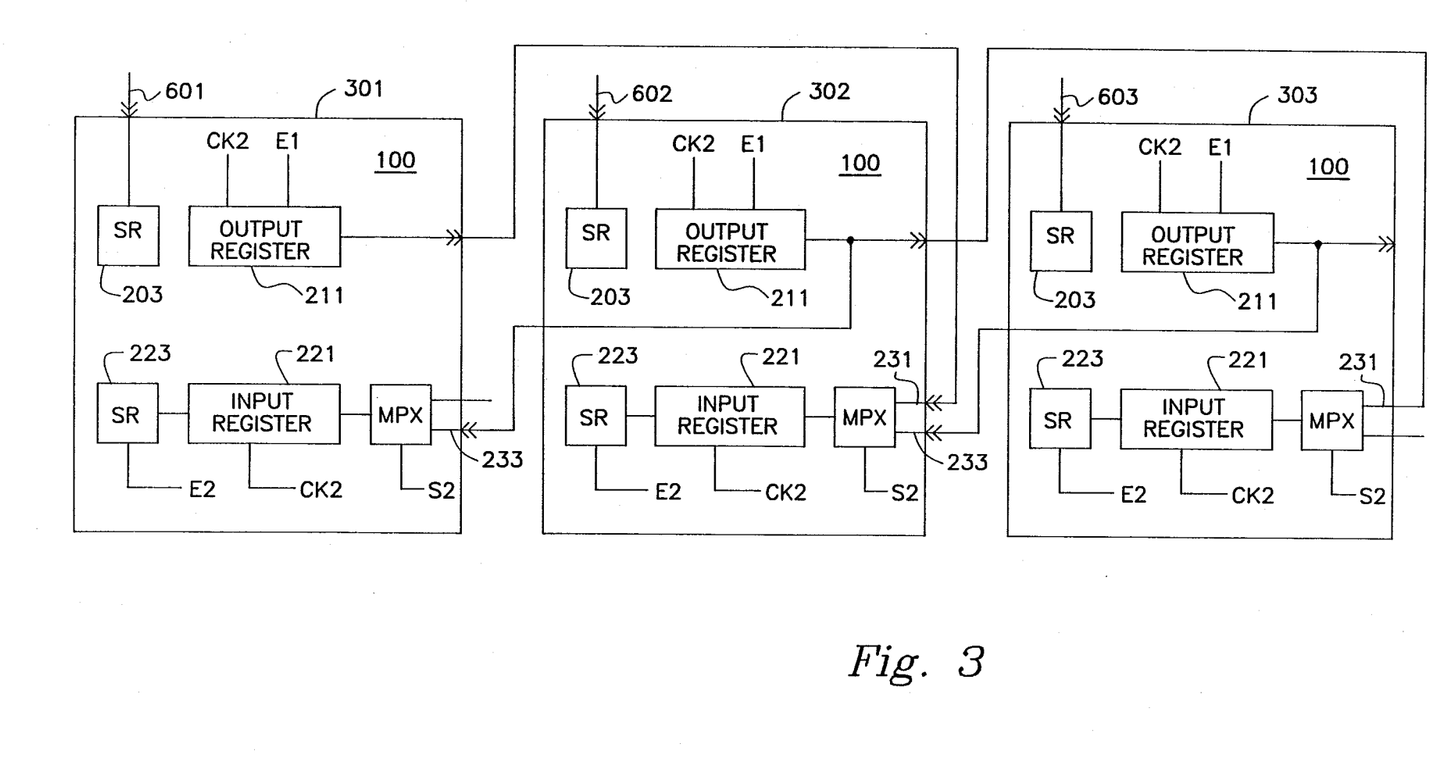
FIG. 3 is a block diagram showing the interconnection of three parallel neighborhood transformation modules.

FIG. 3 illustrates the parallel pipeline neighborhood transformation processor of the present invention in which the array is divided into three partitions. The purpose of FIG. 3 is to illustrate the connections between three identical neighborhood transformation modules 100, and in particular show the connections between the input and output shift register 211 and 221, respectively, between the modules to permit the transferring of edge data information in a manner as will be described.

In FIG. 3, the left hand NTM module is identified as module 301, the right hand NTM module is identified as 303, and the middle NTM module is identified as 302. All of the NTM modules 301, 302, and 303 are identical—similar to modules 30, 31, and 3 of FIG. 1. Components in each of the NTM modules 301, 302, 303 which have the same intended function as in FIG. 2 have identical numerical designations as those of NTM module 100 of FIG. 2. The output of output shift register 211 of module 302 is connected to input means 233 of preceeding module 301 and input means 231 of following module 303. The output of shift register 211 of module 301 is presented to input means 231 of following module 302. The output of output shift register 211 of module 303 is presented to input means 233 of preceeding module 302.

Figure 4A:
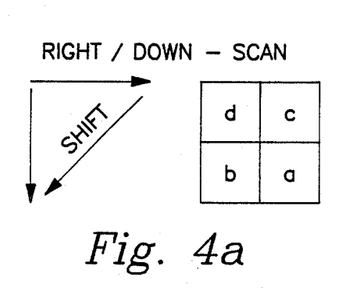
FIGS. 4a–4d are diagramatic representations of raster scan control schemes.

FIGS. 4a, 4b, 4c, and 4d illustrate raster line scan control schemes and a neighborhood transformation memory mapping scheme in accordance with the present invention. In particular, FIG. 4a shows a raster line scan moving from left to right and from top to bottom—i.e., right/down-scan. Further, data of the 2×2 window having four corner addresses a, b, c, and d are operated on with the decision that the resultant transformation of the aforesaid 4 corner data values will be stored in the memory means 20 address location corresponding to the former location of the b-address. The above control scheme is further illustrated in FIG. 5.

Figure 5:
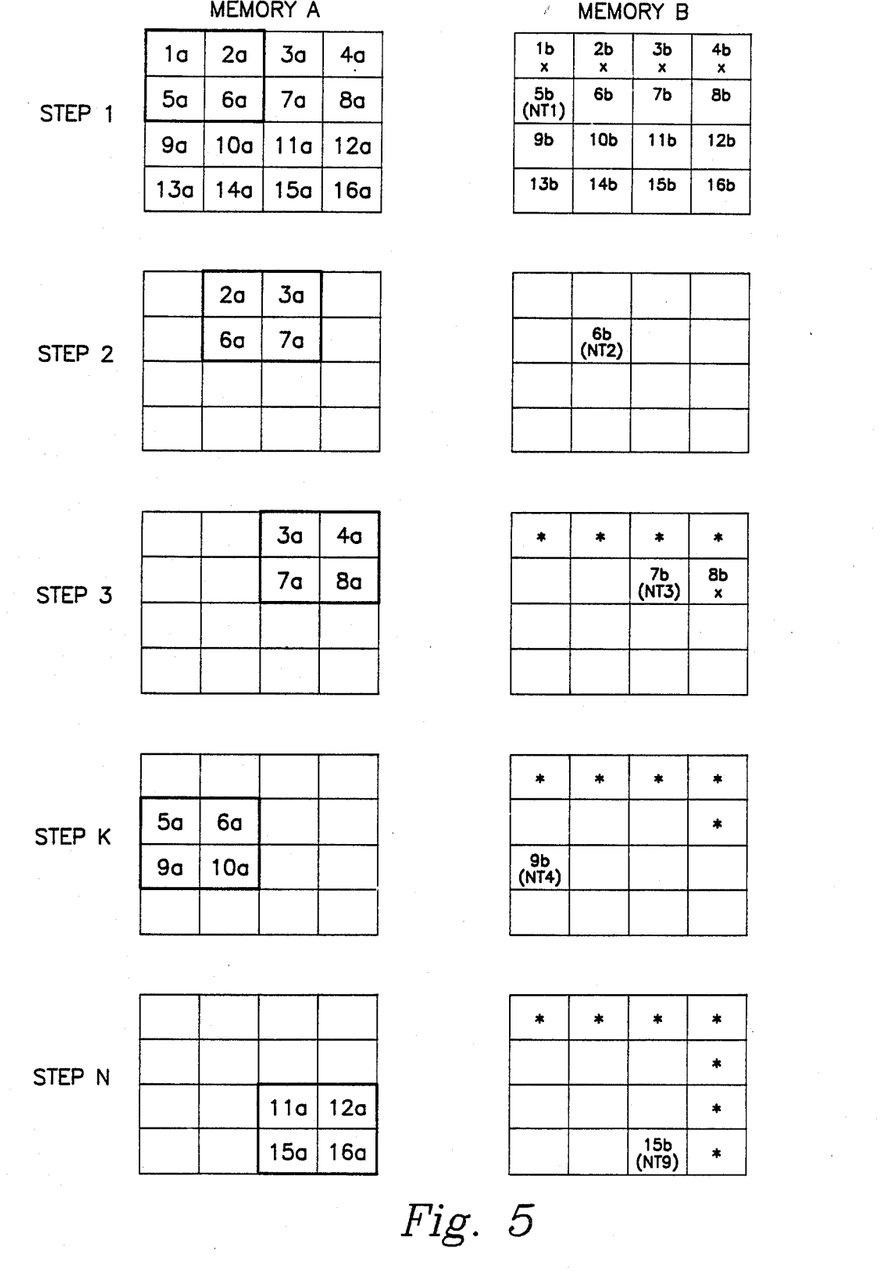
FIG. 5 is a diagram illustrating the neighborhood transformation windows on a memory map.

FIG. 5 illustrates a small matrix example of addresses in memory A having 4 columns and 4 rows. Each of the cells in the memory A matrix is identified by a numeric address 1a to 16a. At Step 1, a first 2×2 neighborhood transformation operates on data in cells 1a, 2a, 5a and 6a, and stores the result NT1 in the location of address 5b of memory B—memory B having corresponding numeral addresses as memory A. In Step 2 the raster scan moves over 1 column and performs the neighborhood transformation on data in cells 2a, 3a, 6a and 7a, and stores the result NT2 in cell 6b. After Step 3, the result of the neighborhood transformation on cells 3a, 4a, 7a and 8a is stored in address 7b and identified as NT3. Note that after Step 3, no further valid 2×2 window transformations can be performed on data values in rows 1 and 2. Therefore, Step 4 (not shown) produces invalid data as noted by the asterisk in cell 8b. At the end of Step 4, the raster line scan is reset down one row and back to the left side as illustrated by Step K. In Step K, a neighborhood transformation NT4 is performed on cells 5a, 6a, 9a and 10a and stored in address 9b. Step N illustrates the next to the last 2×2 window transformation to be performed on data values in the matrix of data values stored in memory A. In Step N, a neighborhood transformation NT11 is performed on cells 11a, 12a, 15a and 16a and stored in address 15b.

It should be recognized by those skilled in the art, that after a complete raster scan of an image stored in memory A, and utilization of a 2×2 window neighborhood transformation scan, and utilization of the storage of the resultant transformations in corresponding addresses of the b cell in memory B, the resulting image is one in which the image shrinks because the top row and the right column no longer have valid neighborhood transformation data. This is particularly indicated in FIG. 5 by the asterisks in the top row and right column of memory B after Step N. Further, the resultant image in the memory matrix has shifted down one row and to the left one column.

Figure 4B:
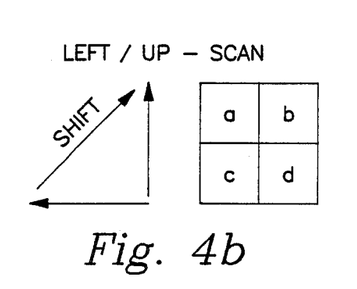
Figure 4C:
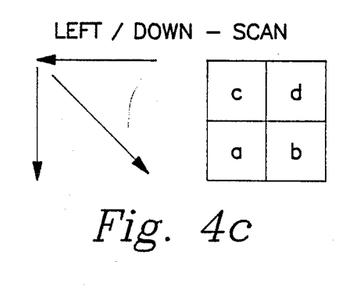
Figure 4D:
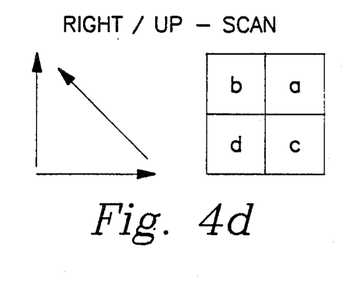

It should be appreciated by those skilled in the art that for each neighborhood transformation, for example by the second transformation by NTM modules 40, 41, and 42 illustrated in FIG. 3, the image in the memory will shift an additional row nd column in the same direction for the same raster line scan pattern. As will be discussed later, the architecture of the present invention can utilize a reverse scan, as illustrated in FIG. 4b, utilizing the same NTM module and control scheme with the result that the resultant neighborhood transformation image will be shifted in a complimentary manner to reposition the image centrally within the image memory map.

The operation of the neighborhood transformation module of FIG. 2 will be described with reference to FIG. 3, the clock cycle timing table presented in FIG. 6, the memory diagrams of FIG. 7, and the raster line scan diagram of FIG. 4a.

Figure 6:
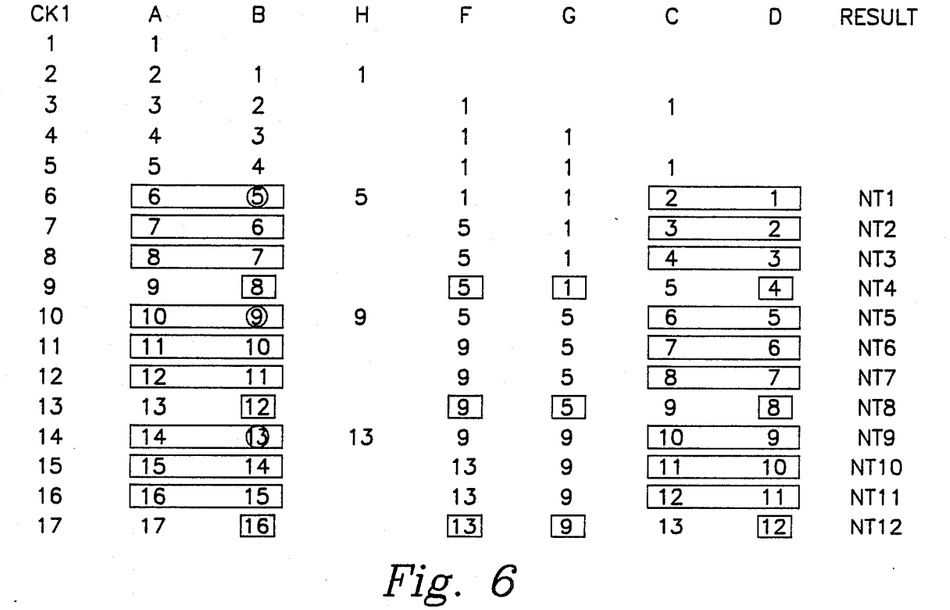
FIG. 6 is a clock cycle timing illustrating the operation of the neighborhood transformation module of FIG. 2.
Figure 7:
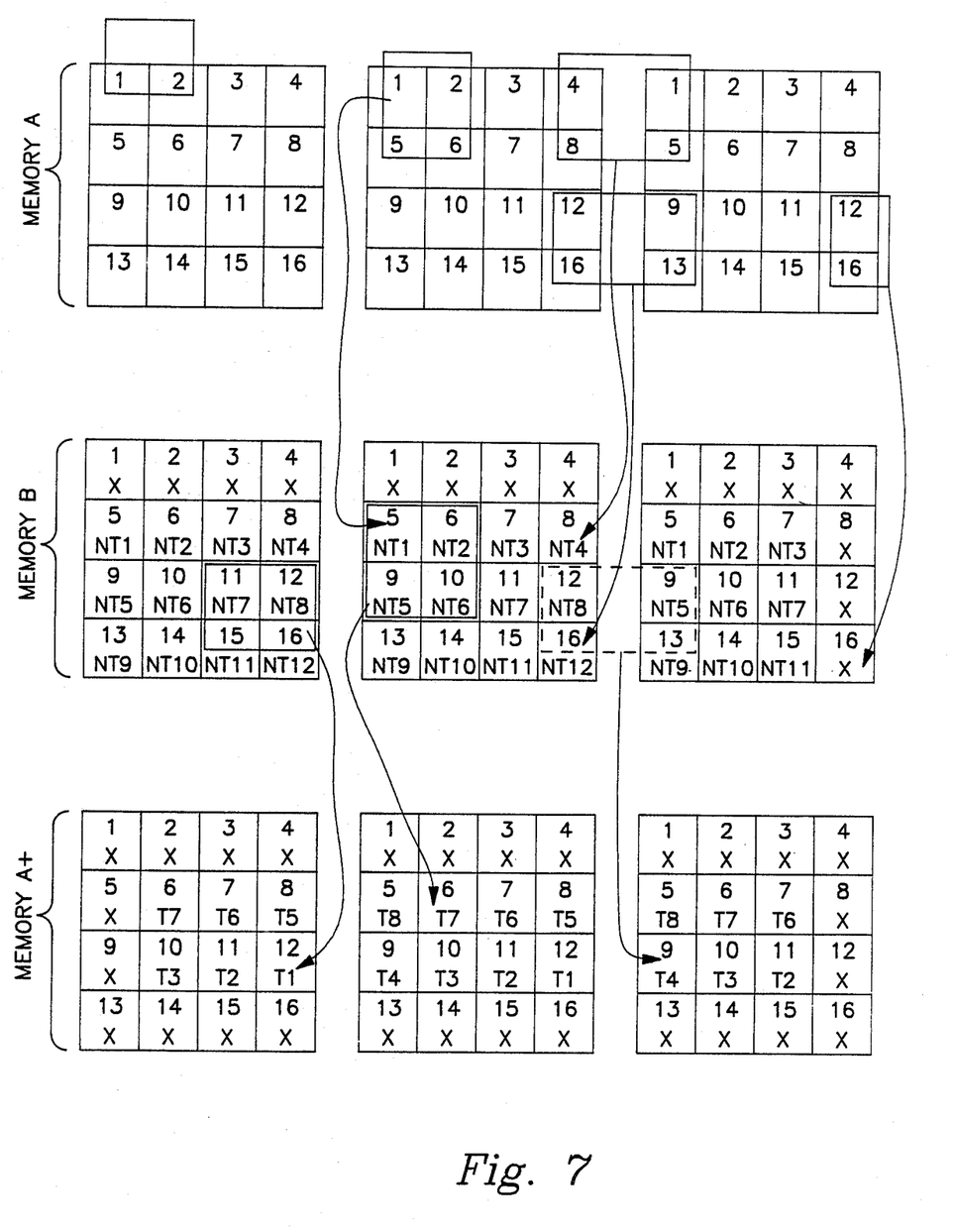
FIG. 7 is a memory map of a 3-segment partitioned memory in accordance with the present invention.

FIG. 7 illustrates 3-segment partitioned image data memory maps A, B and A+ similar to FIG. 5. Each memory map has 4 rows and 12 columns. Further, consider that the image data and corresponding memory map is divided into 3 segments as illustrated in memory map segments 601, 602 and 603. In each of the memory maps, the upper left memory cell is identified by address 1, and the lowest right hand cell identified by address 16. Further, it should be assumed that the output data from the memory partitions 601, 602, and 603 are sequentially fed on a signal buss (by connections not shown) into each of the transformation modules 301 302, and 303, respectively, as illustrated in FIG. 3 in accordance with the raster line scan as illustrated in FIG. 4a. That is, the cell data is sequentially fed, for a selected clock cycle, from the memory, one cell at a time and one line at a time, starting with the address corresponding to the upper left corner of the memory map and scanning from the left to the right for each line scan. The details in FIG. 6 show the address of the data (not the data itself) on input means a, b, c and d which are presented to the neighborhood transformation processor 250 for each clock cycle CK1.

The clock cycle timing table in FIG. 6 and the memory map diagrams illustrated in FIG. 7 diagrammatically illustrate the operation of any of the NTM modules, but particularly for the middle NTM module 302, for a right/down-scan. The heading of the table of FIG. 6 indicates the signal letters as defined earlier with respect to FIG. 2. The numeral under the "letter" columns indicate the cell address of the particular partitioned memory. The following exposition describes the flow of data following each complete clock cycle CK1. The "circled" cells indicate needed edge data by the adjacent NTM module. "Boxed" cell data indicates the cell data required for the neighborhood 2×2 transformation.

After the the second clock cycle, signal B, containing data of cell 1, is loaded into shift register 211 upon command of signal E1. In the timing background for the example illustrated, at a generally faster clock rate CK2, the contents of output shift register 211 is serially shifted into the input shift register 223 of the preceding NTM module 301 through connecting means 231. At the same time the contents of the output shift register 211 of the following NTM module 303 is serially shifted into input shift register 221 of module 302 through connecting mean 233. Upon command of signal E2, signal F is loaded into SR 223. In like manner, after the 6th clock cycle, the contents of cell 5 is loaded into input shift register 221. Thus, before the 10th clock cycle, signal G represents the contents of cell 1 and signal F represents the contents of cell 5. The combination of output shift register 211 and input shift register 221 allows passage and storage of edge data over a single serial data transmission line between NTM modules. This allows, therefore, background timing activity while cell data is passed through registers 205, 212, and 215, and minimum signal lines between NTM modules.

Generally, it should be noted that clock rate CK2 need not be faster than CK1, and may actually be the same as CK1. That is, CK2 may be the same as CK1 (or even slower) if the number of columns per segment is greater than the number of bits per data value stored in a memory cell (i.e., the length of the output serial shift register, e.g. register 211).

A discussion of the function of the delay register 212 and the size of delay will now be presented. In the example as illustrated in FIG. 6, the memory image is divided into 3 segments in which each segment includes 4 columns. For proper operation of the NTM module 100, delay register 212 must be equivalent to N-total-image-columns (12) divided by the number of K-partitions (3) less 1—i.e., (N/K) −1. In the instant example, the delay register must provide the equivalent of 3 clock cycles (12 divided by 3 less 1). Therefore, in the present example, the delay register must be the equivalent of 3 clock cycles long before data is available at the delay register output 213, identified by the letter "C". Accordingly, the contents of cell no. 1 is available at C after the fifth clock cycle. After the sixth clock cycle, the value of signals A, B, C, and D are precisely the window pattern of FIG. 4a and the window illustrated at Step 1 of FIG. 5 for memory A. Namely, D has the value of cell no. 1, and C has the value of cell no. 2, B has the cell value of no. 5, and A has the value of cell no. 6. In like manner, after each clock cycle CK1, the values of A, B, C, and D correspond to the scanning 2×2 window.

The discussion which follows describes the operation of the multipath switch in order to perform neighborhood transformations at partition edges. After the sixth clock cycle multipath switch 207 is set by switch S1 to present the outputs A, B, C and D as the inputs a, b, c and d to neighborhood transformation processor 250. After the 7th clock cycle, the beginning of the neighborhood transformation of cells 2, 3, 6 and 7, begins in processor 250. The transformation process takes place sequentially through one or more clock cycles until the data is available at the output 290 of processor 250 for subsequent storage in memory B or presentation to a subsequent transformation stage as illustrated in FIG. 1. Assuming there is only one transformation stage, the data represented by signals A, B, C, and D after the 6th, 7th, and 8th clock cycles correspond to the 2×2 window moving as shown by Steps 1, 2, and 3, respectively, of FIG. 5. In these circumstances, the multipath switch 207 control signal S1 is such to allow signals A, B, C, and D to become the input signals a, b, c, and d presented to the neighborhood processor 250. Therefore, the neighborhood transformation values NT1, NT2, and NT3 can be calculated sequentially by the neighborhood transformation processor.

However, after the 9th clock cycle, the middle NTM module requires edge data from the following NTM module 303. In these circumstances, switch control S1 is changed to control the multipath switch 207 to cause the connection of signal G to processor 250 input signal a, and signal F to processor 250 input signal c. At this point, processor 250 can perform the neighborhood transformation NT4 on the proper 2×2 window cell data as illustrated by window 610 in FIG. 7.

After the 9th clock cycle, SR 223 is again enabled to store signal F. Further, after the 10th clock cycle, cell 9 is serially passed to input register 221 for use after the 13th clock cycle when edge data is again required to obtain the NT8 transformation. The pattern, of course, repeating for edge data needed at the 17th clock cycle. Thus, a complete raster line scan utilizing a 2×2 window scan is completed after the 17 clock cycles. Since each of the NTM modules 301, 302, and 303 are operating in the same way at the same time, the complete image is transformed after the the 17 clock cycles.

As shown in FIG. 7, the neighborhood transformations NT1 through NT12 are stored in memory B with the image shifted to the right and down as already discussed. However, as indicated earlier, a pipeline of processors can serially process the output of the neighborhood transformation processor in order to further transform the image data before being passed back to memory B. It should be understood that memory B may be the same memory A, or alternatively be a separate partition of a memory at least equal to the size of memory A.

Figure 8:
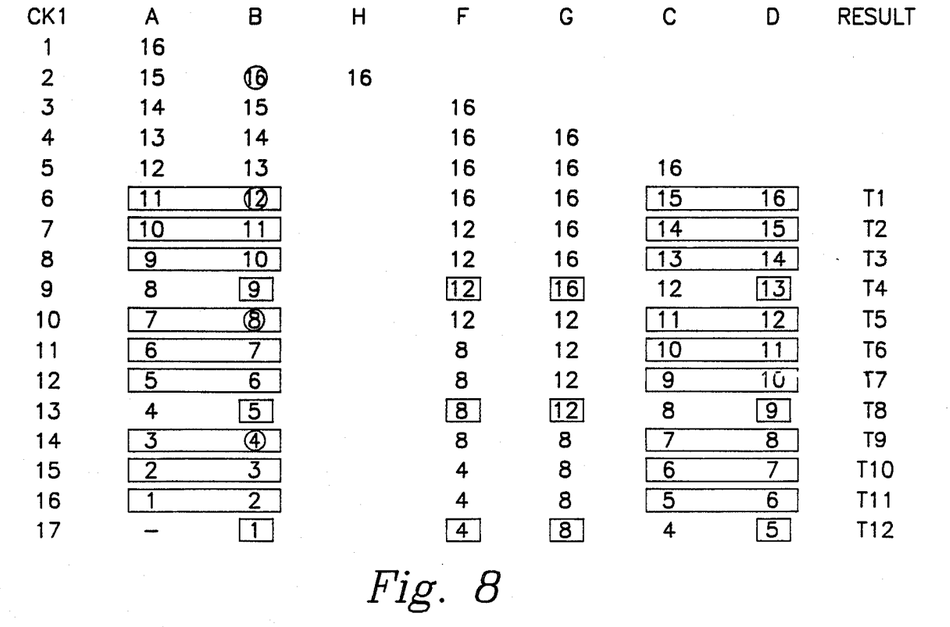
FIG. 8 is a clock cycle timing table illustrating the operation of the neighborhood transformation module with the reverse scan of FIG. 4b.

In the present invention, the same NTM modules with the same control scheme can be used in order to reposition the image in the memory plane without a complex or sophisticated memory control scheme. In the present invention, all that is required is simply reversing the scan of the memory as particularly illustrated by FIG. 4b—namely, scan left and up. The table illustrated in FIG. 8 shows the signal values, like the table in FIG. 6, for the situation in which the scan is the left-up-scan. The results are particularly illustrated by the memory map of FIG. 7 in which the values of memory B are reversed scanned and stored in memory A+. The resultant image in memory A+ has shifted to the right and up—opposite of the resultant shift cause by the right-down -scan.

It should be noted, however, that when the scan is reversed as aforesaid, it is necessary when obtaining edge data for the window, that the edge data must be obtained from the preceding NTM module. In these circumstances, signal S2 is operated to cause the multiplexer 235 to connect the connecting means 31 to the input of input shift register 221. The remaining signals and operation of the NTM module remain the same as in the previous discussion.

It should be noted that the window storage scheme when using the reverse scan is the same as the right-down-scan. Namely, results are store in the "b" cell location. A comparison of the 2×2 windows of FIG. 4a and 4b indicate that the image is turned upside down and right-to-left. Accordingly, after the reverse scan the above state inverted picture scan may be read directly from the memory without further processing or memory control. Further complimentary scans like those shown in FIGS. 4c and 4d, and the like, can also be processed by the NTM module of the present invention.

Figure 9:
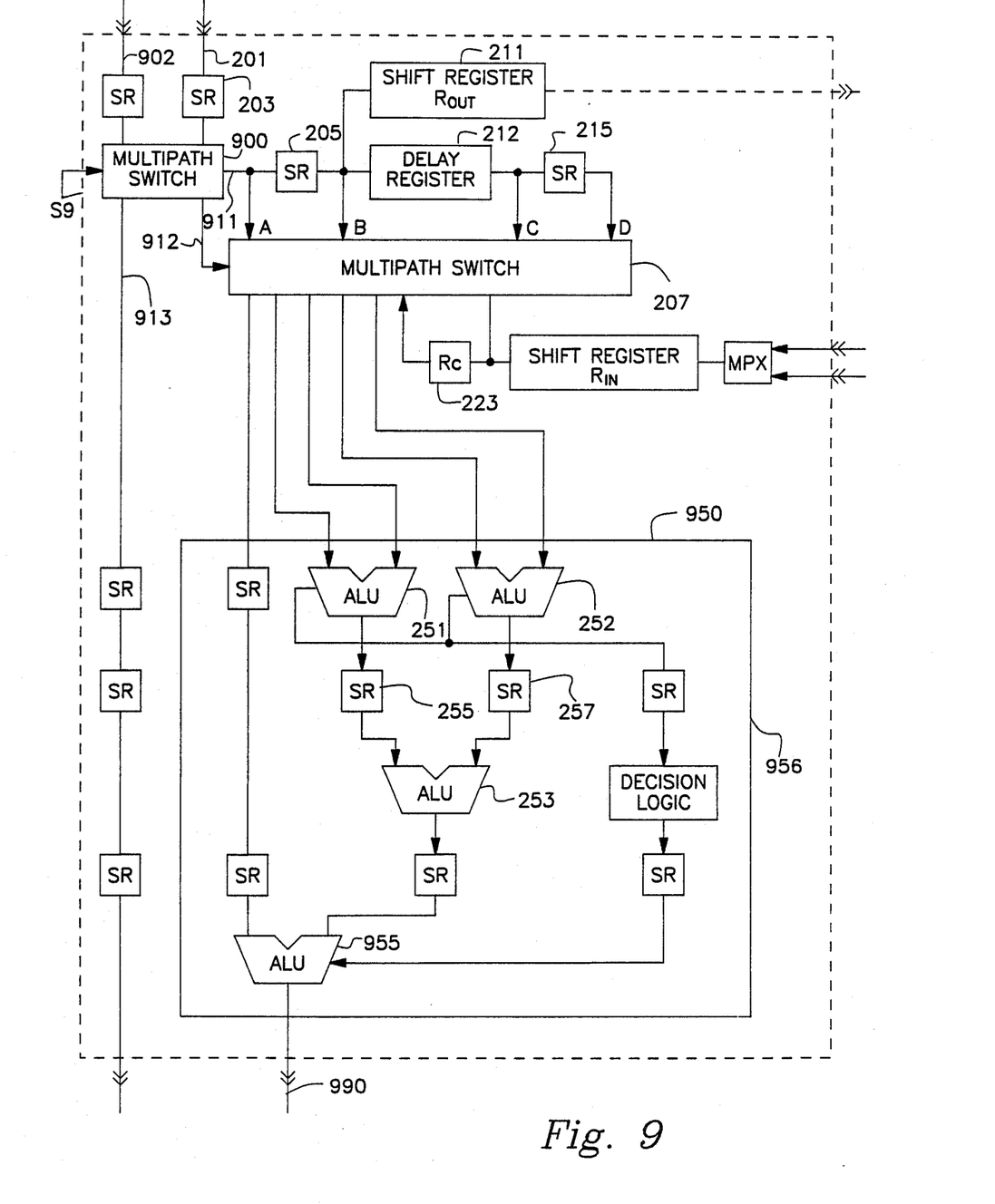
FIG. 9 is another embodiment of the neighborhood transformation module in accordance with the present invention.

FIG. 9 illustrates an enhanced version of the NTM module as shown in FIG. 2 with enhanced capability of image processing algorithms and the like. Like functioning components as FIG. 2 have the same numeral designations in FIG. 9. The NTM module of FIG. 9 includes a multipath switch 900 for serially presenting either of two image matrixes through NTM transformation processor 950 or providing various combinations. The multipath switch can select connection from either of the two input signal 201 or 902, and connect them to any of three or more output lines 911, 912, or 913 under control of command signal input S9. Output 911 is similar to output means 204 of FIG. 2. Output 912 allows connection directly to multipath switch 207 for further selective processing by a more complex multipath switch and neighborhood transformation processor.

As illustrated in FIG. 9, processor 950 includes an additional ALU 955 and Decision Logic Circuit 956 along with a plurality of storage registers (SR) for proper timing of the signal processing. Like the NTM module of FIG. 2, the output 990 of processor 950 can be sequentially processed again in the usual pipeline or passed back to memory as already described.

The NTM module of FIG. 9 including processor 950 allows tremendous latitude in combining images, both current and past images, to provide a wide variety of image processing strategies. It should be understood that common to both of the NTM modules of FIG. 2 and FIG. 9 is the use of the 2×2 window neighborhood transformation architecture which is extremely simple in design and allows greater flexibility in image processing and faster throughput.

It should be understood that although the NTM module utilizing the 2×2 window has been illustrated with regard to image processing applications, it is within the true spirit and scope of the present invention to be applicable to any data matrix in which neighborhood transformation processing is required. Further it should be understood that there are a variety of memory mapping schemes which may be utilized without departing from the true spirit and intent of the present invention.

It should also be noted that the term storage register may be provided by a wide variety of circuit techniques to provide the intended function. Although the invention has been described with 4×4 memory maps, any memory size is applicable within the scope of the present invention.

Lastly, the multipath switch 207 has been illustrated to provide specific switch connections A, B, C, and D, to outputs a, b, c, and d, respectively. However, the generalized use of multipath switch 207 allows A, B, C, and D to be arbitrarily connected to a, b, c, and d in a variety of ways, e.g. A to d, B to a, C to b, and D to e, etc.

I claim:
1. An apparatus for image processing an n-column by m-row array of image data values where said data values correspond to an n-column by m-row image sensor array, and said data values are stored in addressable cells of an image data memory, said apparatus comprising:
read out means for reading said image data memory and sequentially outputting a stored one of said data values of said image data memory for successive clock cycles of a first clock signal on a first output signal means in accordance with a selected raster line scan pattern of said image sensor array;
data sequencing means having a first input means for receiving said stored data values on said first output signal means, and having second, third, fourth, and fifth output signal means, said data sequencing means concurrently outputting data values on said second, third, fourth, and fifth output signal means corresponding to four corner data values of a 2×2 window of said image sensor array, said four corner data values sequentially changing for successive clock cycles of said first clock signal in accordance with a sliding window which slides in a raster line scan pattern substantially similar to to said selected raster line scan pattern; and
neighborhood transformation processor means having input means for receiving said four corner data values on said second, third, fourth, and fifth output signal means, and having a sixth output signal means, said processor means capable of performing a selected neighborhood transformation on said four corner data values, and said processor means sequentially outputting the result thereof on said sixth output signal means for successive clock cycles of said first clock signal.

2. The apparatus of claim 1 where in said data sequencing means comprises:
first and second storage registers, and a delay means, each having an input and output means, said input means of said first storage register adapted to be coupled to said first output signal means, said output means of said first storage register coupled to said input means of said delay means, and said output means of said delay means coupled to said input means of said second storage register, said input means of said first storage register, said delay means, and said second storage register serving as said second, third, and fourth output signal means, and said output means of said second storage register serving as said fifth output signal means.

3. The apparatus of claim 2 wherein said delay means provides delay substantially equal to an integer number of clock cycles wherein said integer is equal to the integer value of the number of columns in said array less 1.

4. An apparatus for image processing an n-column by m-row array of image data values where said data values correspond to an n-column by m-row image sensor array, and said data values are stored in addressable cells of an image data memory, said apparatus comprising a plurality of neighborhood transformation modules having,
read out means for reading said image data memory and sequentially outputting a stored one of said data values of said image data memory for successive clock cycles of a first clock signal on a first output signal means in accordance with a selected raster line scan pattern of p-columns by m-rows of a partitioned segment of said image sensor array, data sequencing means having a first input means for receiving said stored data values on said first output signal means, and having second, third, fourth, and fifth output signal means, said data sequencing means concurrently outputting data values on said second, third, fourth, and fifth output signal means corresponding to four corner data values of a 2×2 window of said image sensor array, said four corner data values sequentially changing for successive clock cycles of said first clock signal in accordance with a sliding window which slides in a raster line scan pattern substantially similar to said selected raster line scan pattern, output storage means coupled to said first input means for subsequentially storing edge data values of a selected one of said first and last columns of said p-column array, input storage means coupled to said output storage means of a selected one of a preceeding and following one of said plurality of neighborhood transformation modules for receiving edge data values stored in said output storage means, said input storage means including means for storing two successive edge data values of said selected one of said first and last columns, said input storage means including first and second edge data output means for outputting said two successive edge data values, switch means for selectively connecting said second, third, fourth, and fifth output signal means, and said first and second edge data output means onto first, second, third, and fourth switch output means, such that said first, second, third, and fourth switch output means represents four corner data values of said sliding window including those windows encompassing said edge data of a selected one of a preceeding and following one of said partitioned segments, and neighborhood transformation processor means having input means for receiving said four corner data values on said first, second, third, and fourth switch output means, and having a sixth output means, said processor means capable of performing a selected neighborhood transformation on said four corner data values, and said processor means sequentially outputting the result thereof on said sixth output means for successive clock cycles of said first clock signal.

5. The apparatus of claim 4 wherein said switch means includes:

means for selectively connecting said second, third, fourth, and fifth output signal means onto first, second, third, and fourth switch output means, respectively, for each line of said raster line scan of said window not requiring edge data from a selected one of a preceeding and following one of said segments, and means for selectively connecting
(i) said first and second edge data output means to said first and third switch output means, respectively, and
(ii) said second and fourth output signal means to said second and fourth switch output means, respectively, at those times at the end of each line of said raster line scan of said window requiring edge data.

6. The apparatus of claim 4 where in said data sequencing means comprises:

first and second storage registers, and a delay means, each having an input and output means, said input means of said first storage register adapted to be coupled to said first output signal means, said output means of said first storage register coupled to said input means of said delay means, and said output means of said delay means coupled to said input means of said second storage register, said input means of said first storage register, said delay means, and said second storage register serving as said second, third, and fourth signal output means, and said output means of said second storage register serving as said fifth signal output means 7. The apparatus of claim 6 wherein said delay means provides delay substantially equal to an integer number of clock cycles wherein said integer is equal to the integer value of the number of columns in said array less 1.

8. The apparatus of claim 6 wherein said output storage means is a first shift register.

9. The apparatus of claim 8 wherein:

said input storage means includes a second shift register and a third storage register, each having an input means and an output means, the output means of said second shift register being coupled to said input means of said third storage register, said output means of said second shift register providing said second edge data output means, and said output of said third storage register providing said first edge data output means; and said apparatus further comprising a timing control means for,
(i) serially shifting said edge data value stored in said first shift register into said input storage means second shift register, in response to an enabling signal, and
(ii) transferring the output of said second shift register into said third storage register in response to a command signal presented to said third storage register.

10. An apparatus for image processing an n-column by m-row array of image data values where said data values correspond to an n-column by m-row image sensor array, and said data values are stored in addressable cells of an image data memory, said apparatus comprising a plurality of neighborhood transformation modules having, read out means for reading said image data memory and sequentially outputting a stored one of said data values of said image data memory for successive clock cycles of a first clock signal on a first output signal means in accordance with a selected raster line scan pattern of p-columns by m-rows of a partitioned segment of said image sensor array, data sequencing means having a first input means for receiving said stored data values on said first output signal means, and having second, third, fourth, and fifth output signal means, said data sequencing means concurrently outputting data values on said second, third, fourth, and fifth output signal means corresponding to four corner data values of a 2×2 window of said image sensor array, said four corner data values sequentially changing for successive clock cycles of said first clock signal in accordance with a sliding window which slides in a raster line scan pattern substantially similar to said selected raster line scan pattern, input storage means coupled to a selected one of a preceeding and following one of said plurality of neighborhood transformation modules for receiving edge data values of a selected one of said first and last columns of said p-column array of said partitioned segment associated therewith, said input storage means including means for storing two successive edge data values of said selected one of said first and last columns, said input storage means including first and second edge data output means for outputting said two successive edge data values, switch means for selectively connecting said second, third, fourth, and fifth output signal means, and said first and second edge data output means onto first, second, third, and fourth switch output means, such that said first, second, third, and fourth switch output means represents four corner data values of said sliding window including those windows encompassing said edge data of a selected one of a preceeding and following one of said segments, and neighborhood transformation processor means having input means for receiving said four corner data values on said first, second, third, and fourth switch output means, and having a sixth output means, said processor means capable of performing a selected neighborhood transformation on said four corner data values, and said processor means sequentially outputting the result thereof on said sixth output means for successive clock cycles of said first clock signal.

11. The apparatus of claim 10 wherein said switch means includes:

means for selectively connecting said second, third, fourth, and fifth output signal means onto first, second, third, and fourth switch output means, respectively, for each line of said raster line scan of said window not requiring edge data from a selected one of a preceeding and following one of said segments, and means for selectively connecting
  (i) said first and second edge data output means to said first and third switch output means, respectively, and
  (ii) said second and fourth output signal means to said second and fourth switch output means, respectively, at those times at the end of each line of said raster line scan of said window requiring edge data.

12. The apparatus of claim 10 where in said data sequencing means comprises:

first and second storage registers, and a delay means, each having an input and output means, said input means of said first storage register adapted to be coupled to said first output signal means, said output means of said first storage register coupled to said input means of said delay means, and said output means of said delay means coupled to said input means of said second storage register, said input means of said first storage register, said delay means, and said second storage register serving as said second, third, and fourth signal output means, and said output means of said second storage register serving as said fifth signal output means 13. The apparatus of claim 12 wherein said delay means provides delay substantially equal to an integer number of clock cycles wherein said integer is equal to the integer value of the number of columns in said array less 1.

14. The apparatus of claim 12 wherein said input storage means is a shift register.

15. The apparatus of claim 14 wherein:

said input storage means includes a third storage register, each having an input means and an output means, the output means of said shift register being coupled to said input means of said third storage register, said output means of said shift register providing said second edge data output means.

* * * * *